March 23, 1926.
R. H. LANGDALE
SHOCK ABSORBER
Filed Feb. 21, 1925
1,577,734
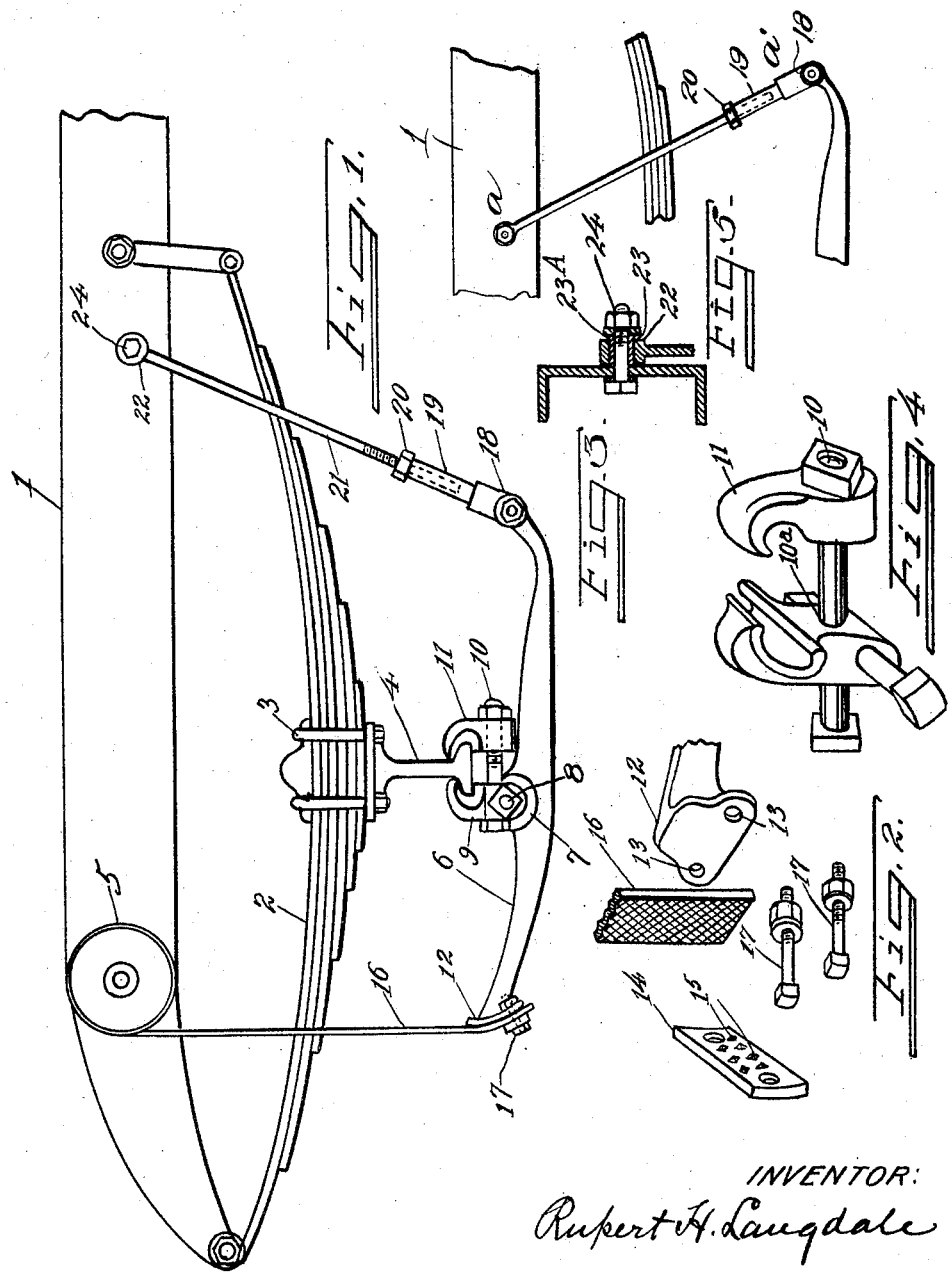
INVENTOR:
Rupert H. Langdale
BY Allen & Allen
ATTORNEYS.

Patented Mar. 23, 1926.

1,577,734

UNITED STATES PATENT OFFICE.

RUPERT H. LANGDALE, OF CINCINNATI, OHIO.

SHOCK ABSORBER.

Application filed February 21, 1925. Serial No. 10,960.

*To all whom it may concern:*

Be it known that I, RUPERT H. LANGDALE, a citizen of the United States, residing in Cincinnati, county of Hamilton, and State of Ohio, have invented certain new and useful Improvements in Shock Absorbers, of which the following is a full, clear, and exact description, reference being had to the accompanying drawing, forming part of this specification.

My invention relates to snubbers in general and particularly to connecting devices for snubbers.

Shock absorbers and snubbers, of the type referred to, form a resilient retarding connection between the frame of the vehicle and the axles in order to counterbalance the rebound force of the springs and it is my purpose to provide a pivoted lever with the fulcrum disposed on the axle and to have one arm connected with the strap or connecting member from the shock absorber supported on the frame, which would ordinarily be attached directly to the axle, and to have the other arm hinged to an adjustable rod attached to the frame. It is further my object to have this lever of sufficient length to act as a shock distributor which transmits the counter rebound action of the snubber or absorber to the frame in such opposed directions that the spring rebound is very effectively taken up. It is further my object to provide a simple and effective connecting device to connect one end of the pivoted lever to the shock absorber or snubber and to have the adjustable arm adapted to connect with the frame of the vehicle in such position as has been predetermined for the particular type to which it belongs.

Almost all spring shock absorbers are confined for adjustment to varying the tension of the spring, but in my structure as noted, I provide for an adjustment so that I am able to vary the resulting action of the rebound shock to whatever degree has been found to be most effective on the type of car on which my device is being installed, without confining all the adjustment to the spring of the shock absorber. Thus by the location of connection of my lever to the vehicle frame and the length of the two arms I am able to vary the action of the snubber to the one desired.

Referring to the drawing forming part of this specification, Figure 1 is a perspective view of the device as installed on a front axle of an automobile.

Figure 2 is a detail view of the parts of the shoe at one end of the lever which retains the shock absorber strap when the strap type absorber is used.

Figure 3 is a section through the vehicle frame showing my preferred form of attaching and journaling the arm connecting with the end of the lever opposite the shoe to the frame.

Figure 4 is a perspective of one of the axle grippers.

Figure 5 is a side elevation of a portion of the device indicating an alternate method of securing the rod of the lever to the vehicle frame.

In the drawing I have shown a portion of a vehicle frame generally indicated at 1. The spring is indicated at 2 with the spring shackle clips 3 retaining the axle 4 of the vehicle. A shock absorber is shown at 5 and my device is adapted for use with this type of absorber which is commonly called a strap type, spring snubber. The particular type of absorber on the car is well known and universally used. The lever arm 6 is provided with a boss 7. A hole through the boss retains a bolt 8 which is threaded through a gripping lug 9 where it is held by a nut. A hole $10^a$ passes through this gripping lug and a bolt 10 passing through the hole retains a co-operating lug 11. The two lugs grip the axle and provide a secure pivot point and journal for the fulcrum of the lever. In case the lever arm is to be attached to a round axle housing the gripping faces of the lugs are, of course, more rounded than are required to grip a channel shaped front axle. The front of the lever arm is extended in a rounded faced shoe 12 with extended side members provided with holes 13. An abutment plate 14 to fit the lower face of the shoe is roughened with little pointed lugs 15 and the plate has holes in co-operative alignment with the holes in the shoe. When the strap 16 of the shock absorber 5 is laid across the face of the shoe and the plate 14 attached with its face in alignment with the face of the shoe and the bolts 17 passed through the holes and the nuts on the bolts turned down, the strap is very securely held. The strap in operation swings away from the shoe as the shock absorber spring draws up the strap and the rebound results in the strap coming against the curved face. This arrangement prevents wear on the strap.

The trunnioned end 18 of a collar 19 is secured with a bolt or rivet through a hole in a boss at the other end of the lever. Into the collar with a lock nut 20 is screwed the threaded end of a rod 21. The lock nut is adapted to hold the longitudinal adjustment of the rod in the customary manner. The rod extends upwardly to the frame of the vehicle and a boss 22 in the end has a hole 23 in it which retains a loose bushing 23A which extends lengthwise out from the faces of the boss so that when a bolt 24 is attached to the frame and the nuts drawn down to secure it there will be no bearing of the rod against the frame. It is essential that the end of the rod which is thus journaled in a bushing shall not rub against the frame as this would materially hinder the free action of the lever.

As shown the rod has a wide area on the frame of the vehicle to which it may be secured. This area is represented by the portion of the frame between the position in which the rod is shown in the drawing in Figure 1 and the position indicated at a—a' in Figure 5 which shows the extreme sweep of the rod in the direction opposite to that in which it is shown in the drawing in Figure 1. This adjustment varies the action of the lever upon the flattening of the spring.

The action of the snubbers when connected directly between the vehicle frame and the axle can only be a counterbalancing of the vertical motion of the frame in an upward direction met by the resistance of the snubber tending to keep the frame down toward the axle. With my invention it will be quite apparent that the reaction of the device is extended in magnitude of motion by control of the comparative length of the lever arms. In the form illustrated the magnitude is about doubled.

Having thus described my invention, what I claim as new and desire to secure by Letters Patent, is:

1. In a mounting device in combination with a shock absorber on a vehicle, a lever with means for mounting the fulcrum of said lever on the axle of the vehicle, the one arm of the lever adapted to retain the resilient connecting member of the shock absorber, and the other arm of the lever adapted to retain one end of an adjustable rod with means for pivotally mounting the other end of said rod in a desired position on the frame of the vehicle.

2. In combination with a shock absorber mounted on the frame of a vehicle, a lever journaled in clamps on the axle of the vehicle and means adapted to connect the one arm of the lever to the shock absorber, and the other end of the lever adapted to journal the end of an adjustable rod, the rod, and means for journaling the other end of the rod in the frame of the vehicle in a desired position.

3. In a shock absorber with a resiliently supported member to connect the frame and the axle of a vehicle, a lever connected to the member, the one arm of the lever adapted to retain said member, with means for journaling the fulcrum of said lever on an axle of the vehicle, and a member pivotally mounted on the other arm of the lever adapted to engage the frame of the vehicle in a predetermined direction.

4. In a device of the character specified, a shock absorber on the vehicle, a lever, one arm of the lever adapted to be secured to the shock absorber, and the fulcrum portion of the lever adapted to be secured to the axle, and the other arm of the lever adapted to extend toward and be retained on the frame of the vehicle.

5. In a device of the character specified, a gripping shoe on one arm of a lever pivotally mounted on the axle of a vehicle, and the other arm of the lever connected with a rod to the frame of the vehicle, said gripping shoe comprising a round face and a plate with a face adapted to engage the round face of the shoe, a roughened surface on the face of the plate and means for connecting said plate and said shoe in co-operative alignment.

6. In combination with a shock absorber extending downwardly in an approximately vertical direction from the frame to the axle of a vehicle, a lever and a trunnion and a bar adapted to transmit the vertical stress from said downwardly extending portion of the shock absorber to the frame in a predetermined diagonal direction.

7. In combination with the extended strap from a snubber on a vehicle, a lever with one arm rounded at the end and adapted to engage said strap, with means for mounting the fulcrum of said lever on the axle of the vehicle, and means for pivotally mounting a rod on the other arm and means for pivotally mounting the other end of the rod on the frame of the vehicle.

8. In combination with the extended strap from a snubber on a vehicle, a lever with one arm rounded at the end and adapted to engage said strap, with means for mounting the fulcrum of said lever on the axle of the vehicle, and means for pivotally mounting a rod on the other arm and means for pivotally mounting the other end of the rod on the frame of the vehicle, whereby said rod will reciprocate freely without rubbing the frame of the vehicle.

RUPERT H. LANGDALE.